US012748432B2

(12) United States Patent
Tao

(10) Patent No.: US 12,748,432 B2
(45) Date of Patent: Sep. 29, 2026

(54) CONTROL DEVICE AND METHOD FOR TRAJECTORY PLANNING OF TURNING MOTION OF LEGGED ROBOT AND COMPUTER-READABLE STORAGE MEDIUM

(71) Applicant: UBTECH ROBOTICS CORP LTD, Shenzhen (CN)

(72) Inventor: Bo Tao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 148 days.

(21) Appl. No.: 18/810,427

(22) Filed: Aug. 20, 2024

(65) Prior Publication Data

US 2025/0068176 A1 Feb. 27, 2025

(30) Foreign Application Priority Data

Aug. 23, 2023 (CN) ........................ 202311072253.5

(51) Int. Cl.
*G05D 1/43* (2024.01)
*B62D 57/032* (2006.01)

(52) U.S. Cl.
CPC ............. *G05D 1/43* (2024.01); *B62D 57/032* (2013.01)

(58) Field of Classification Search
CPC ..... G05D 1/43; G05D 2109/12; B62D 57/032
See application file for complete search history.

(56) References Cited

U.S. PATENT DOCUMENTS

2018/0256989 A1* 9/2018 Adekunle ........... A63F 13/2145

FOREIGN PATENT DOCUMENTS

| | | | | |
|---|---|---|---|---|
| CN | 205387156 U | * | 7/2016 | |
| CN | 109398521 A | * | 3/2019 | B62D 57/032 |
| CN | 116540762 A | * | 8/2023 | G05D 1/0891 |

OTHER PUBLICATIONS

Chen, Xuedong, et al. "Implementation of omnidirectional crawl for a quadruped robot." Advanced Robotics 15.2 (2001): 169-190. (Year: 2001), accessed Mar. 13, 2026.*
Chen, Xuedong, et al. "Path tracking based on closed-loop control for a quadruped robot in a cluttered environment." J. Dyn. Sys., Meas., Control 124.2 (2002): 272-280. (Year: 2002), accessed Mar. 13, 2026.*

(Continued)

*Primary Examiner* — Blake A Wood

(57) ABSTRACT

A method for trajectory planning of a turning motion of a spider-type quadruped robot includes: acquiring a desired turning angle of the spider-type quadruped robot in a floating base coordinate system during a current gait cycle; calculating a desired displacement for each support leg of the spider-type quadruped robot in the floating base coordinate system during the current gait cycle based on the desired turning angle; and performing discrete trajectory planning in the floating base coordinate system based on the desired displacements of the support legs, to obtain a desired turning motion trajectory for each of the support legs of the spider-type quadruped robot in the floating base coordinate system during the current gait cycle.

20 Claims, 8 Drawing Sheets

(56) References Cited

OTHER PUBLICATIONS

Y. Oh and J. -H. Kim, "System Design and Implementation of Multi-legged Spider Robots for Landmine Detection in the Demilitarized Zone," 2021 18th International Conference on Ubiquitous Robots (UR), Gangneung, Korea (South), 2021, pp. 228-234, doi: 10.1109/UR52253.2021.9494703. (Year: 2021).*
English Machine Translation of CN116540762A, Accessed Jul. 10, 2026 (Year: 2023).*
English Machine Translation of CN109398521A, Accessed Jul. 10, 2026 (Year: 2019).*
English Machine Translation of CN205387156U, Accessed Jul. 10, 2026 (Year: 2016).*

* cited by examiner

CONTROL DEVICE AND METHOD FOR TRAJECTORY PLANNING OF TURNING MOTION OF LEGGED ROBOT AND COMPUTER-READABLE STORAGE MEDIUM

CROSS REFERENCE TO RELATED APPLICATIONS

This application claims priority to Chinese Patent Application No. CN 202311072253.5, filed Aug. 23, 2023, which is hereby incorporated by reference herein as if set forth in its entirety.

TECHNICAL FIELD

The present disclosure generally relates to legged robots, and in particular relates to a control device and method for trajectory planning of the turning motion of a legged robot and computer-readable storage medium.

BACKGROUND

With the continuous development of science and technology, robotics has garnered widespread attention across various industries due to its significant research and application value. Quadruped robots, in particular, are increasingly valued for their agility, fast movement, and greater stability compared to biped robots. As a result, the development and motion planning control methods for quadruped robots have become increasingly important. Among these, the low-cost spider-type quadruped robot is currently a key research focus in the field of quadruped robots. A crucial technical challenge in controlling quadruped robots is maintaining the stability of the robot's body posture during high-dynamic movements.

Therefore, for a low-cost spider-type quadruped robot, how to ensure that the spider-type quadruped robot maintains a stable body posture during rapid turning movements is an important issue that needs to be urgently addressed in today's quadruped robot control technology.

Therefore, there is a need to provide a method and control device for trajectory planning of the turning motion of a spider-type quadruped robot to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
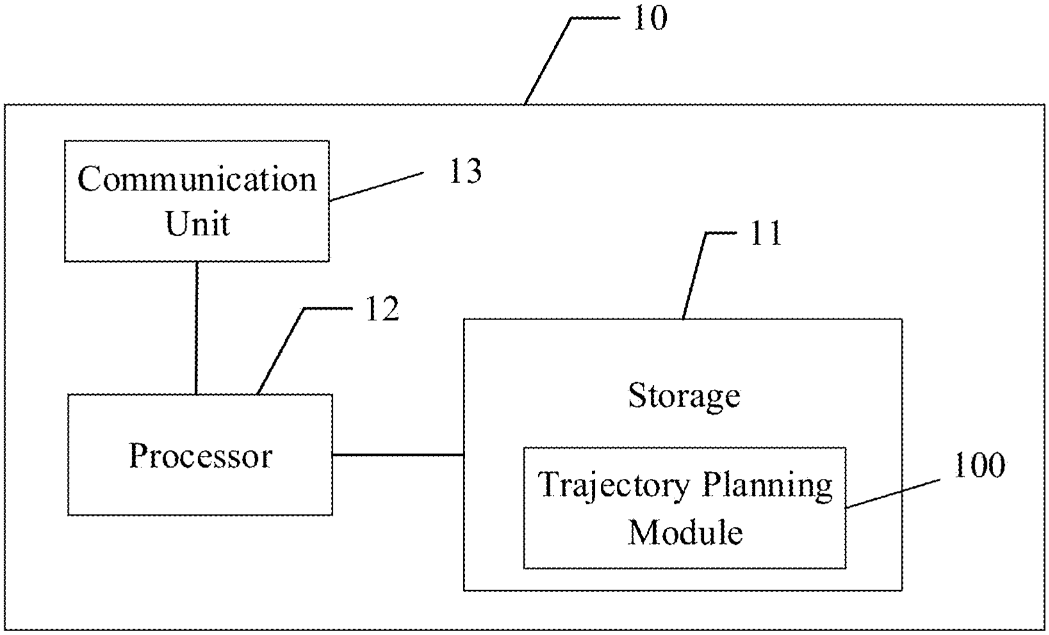
FIG. 1 is a schematic block diagram of a robot control device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Through extensive research, the inventors of the present disclosure have discovered that for low-cost spider-type quadruped robots, due to the limited degrees of freedom in each leg's joints, it is often challenging for the control scheme to simultaneously manage the stride length control in the forward direction, the offset motion control in the lateral direction, and the leg-lifting height control in the vertical direction. This necessitates trade-offs among the control functions of the spider-type quadruped robot. Currently, the motion planning approach for spider-type quadruped robots involves selecting stride length and leg-lifting height as control variables, and planning the foot-end trajectory within the coronal plane (i.e., the XOZ plane) in the world coordinate system to drive the robot to move in the forward direction. The effect of the robot's turning motion relies on setting the difference in the step length of the left and right legs in the aforementioned foot-end trajectory in the support phase (i.e., when the left front leg and right hind leg are in contact with the surface where the robot is located, or when the right front leg and left hind leg are in contact with the surface). This can easily cause the spider-type quadruped robot to experience slippage along the line passing through the foot-ends of the support legs when there is a large difference in step length. As a result, the robot cannot effectively maintain a stable body posture while achieving smooth and rapid turning motion. Additionally, this turning motion scheme is not well-suited for leg structures with non-parallel rotational joints, leading to poor generalization in turning motion planning.

In this context, to address the aforementioned issues, the present disclosure provides a method and device for planning robot turning trajectories suitable for various styles of spider-type quadruped robots, along with robot control device and computer-readable storage media. This approach aims to enhance the generality of turning motion planning while ensuring that the corresponding spider-type quadruped robot can achieve smooth and rapid turning motion while maintaining stable body posture.

The following detailed description of some embodiments of the present disclosure is provided with reference to the accompanying drawings. Where there is no conflict, the embodiments and features described below can be combined with one another.

Figure 2:
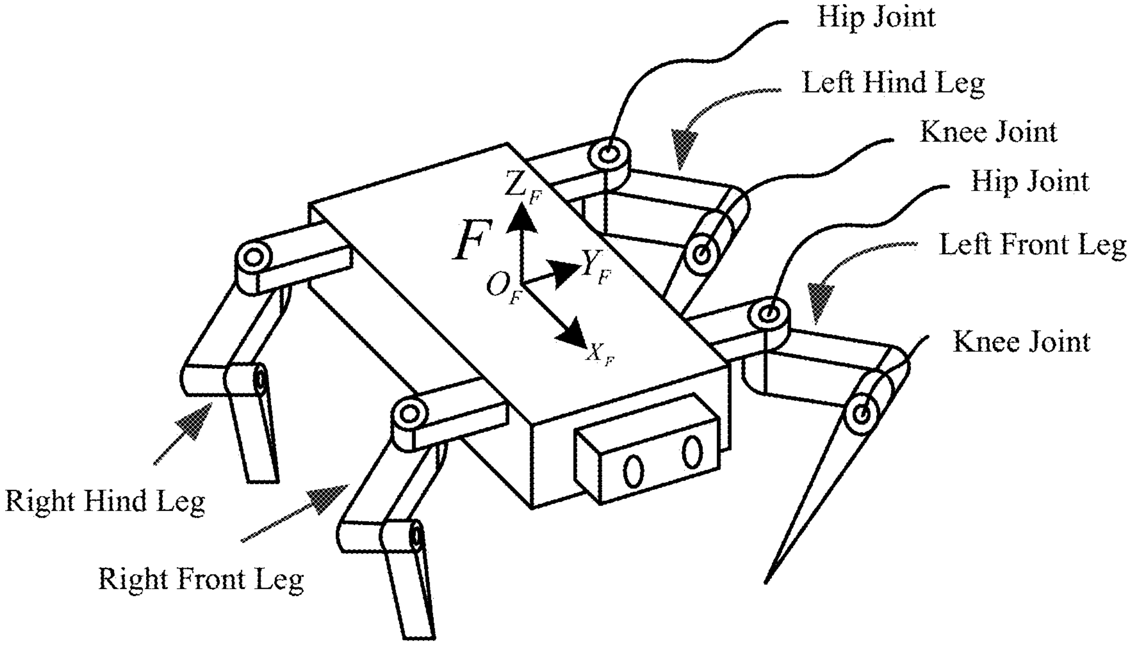
FIG. 2 is a schematic diagram of a spider-type quadruped robot according to one embodiment.

FIG. 1 is a schematic block diagram of a robot control device 10 according to one embodiment. FIG. 2 is a schematic diagram of a spider-type quadruped robot according to one embodiment. In one embodiment, the robot control device 10 can be electrically connected to the spider-type quadruped robot via to control the motion state of the robot, enabling the robot to perform complex desired operational tasks. Specifically, the robot control device 10 can plan an appropriate turning motion trajectory for support legs based on the turning requirements during the actual movement of the spider-type quadruped robot. By applying the planned turning motion trajectory to the robot, it can achieve a smooth and rapid turning motion while effectively maintaining the stability of the posture of the robot's body.

In one embodiment, the robot control device 10 can be a computer device independent of the spider-type quadruped robot. This computer device can be a personal computer, cloud server, laptop computer, or tablet computer. Alternatively, the robot control device 10 can be a hardware module integrated with the spider-type quadruped robot. The spider-type quadruped robot can be position-controlled, force-controlled, or controlled using a hybrid of position and force control. Viewed along the forward direction of the spider-type quadruped robot, the four legs of the spider-type quadruped robot can be divided into a left front leg, a right front leg, a left hind leg and a right hind leg. The degrees of freedom of the joint(s) of each leg of the spider-type quadruped robot can be 3, 4, or 2. Taking the spider-type quadruped robot shown in FIG. 2 as an example, the degrees of freedom for the joints of each leg in the robot of FIG. 2 is 2. The rotational joints of a single leg can include a hip joint and a knee joint, where the hip joint does not undergo relative positional movement with respect to the body of the spider-type quadruped robot.

In one embodiment, the robot control device 10 may include a storage 11, a processor 12, a communication unit 13, and a trajectory planning module 100. The storage 11, the processor 12, and the communication unit 13 are electrically connected to each other directly or indirectly to achieve data transmission or interaction. For example, the storage 11, the processor 12, and the communication unit 13 can be electrically connected to each other through one or more communication buses or signal lines.

In one embodiment, the storage 11 may be, but not limited to, a random-access memory (RAM), a read only memory (ROM), a programmable read-only memory (PROM), an erasable programmable read-only memory (EPROM), an electric erasable programmable read-only memory (EEPROM) and the like. The storage 11 is to store computer programs, and the processor 12 may execute one or more of the computer programs accordingly after receiving an execution instruction.

In one embodiment, the processor 12 may be an integrated circuit chip with signal processing capability. The processor 12 may be a general-purpose processor, including a central processing unit (CPU), a graphics processing unit (GPU), a network processor (NP), a digital signal processor (DSP), an application-specific integrated circuit (ASIC), a field programmable gate array (FPGA), or at least one of other programmable logic devices, discrete gates or transistor logic devices, and discrete hardware components. The general-purpose processor may be a microprocessor or the processor may be any conventional processor, which may implement or execute the methods, steps, and logic diagrams disclosed in the embodiments of the present disclosure.

In one embodiment, the communication unit 13 is to establish a communication connection between the robot control device 10 and other electronic devices through a network, and to send and receive data through the network. The network may include a wired communication network and a wireless communication network. For example, the robot control device 10 can obtain a turning angle for the spider-type quadruped robot through the communication unit 13. The turning angle indicates the actual angle at which the spider-type quadruped robot needs to turn within the current gait cycle, representing the desired turning requirement during the robot's actual motion.

In one embodiment, the trajectory planning device 100 includes at least one software function module that can be stored in the storage 11 in the form of software or firmware or embedded in the operating system of the robot control device 10. The processor 12 can execute the executable modules stored in the storage 11, such as the software function module and computer programs included in the trajectory planning module 100. The robot control device 10 can use the trajectory planning module 100 to plan an appropriate turning motion trajectory for each support leg in real-time in a floating base coordinate system that adapts to the body posture according to the steering requirements during the movement of different styles of spider-type quadruped robots. This ensures that the corresponding spider-type quadruped robots can achieve smooth and fast body turning motion effect while maintaining the stability of the body posture through the planned motion trajectories, which can effectively enhance the general applicability of the turning trajectory planning method across different types of spider-type quadruped robots.

The floating base coordinate system (such as the coordinate system F in FIG. 2) is adapted to the body posture of the spider-type quadruped robot in real time. The origin of the floating base coordinate system (i.e., the origin OF in FIG. 2) coincides with the center of mass of the body of the spider-type quadruped robot. The positive direction of the X-axis (i.e., the axis $X_F$ in FIG. 2) of the floating base coordinate system always points to the forward direction of the spider-type quadruped robot. The positive direction of the Y-axis (i.e., the axis $Y_F$ in FIG. 2) of the floating base coordinate system always points to the left side of the body of the spider-type quadruped robot, which represents the current lateral direction of the body of the spider-type quadruped robot. The $X_FO_FY_F$ plane of the floating base coordinate system is the horizontal plane for the spider-type quadruped robot to adjust its body turning gait. The positive direction of the Z-axis (i.e., the axis $Z_F$ in FIG. 2) of the floating base coordinate system is always perpendicular to the horizontal plane.

It should be noted that the block diagram shown in FIG. 1 is only a schematic diagram of the robot control device 10, and the robot control device 10 may include more or fewer components than those shown in FIG. 1, or have a configuration different from that shown in FIG. 1. Each component shown in FIG. 1 may be implemented by hardware, software, or a combination thereof.

For the spider-type quadruped robot, during walking, the legs can be divided diagonally. The left front leg and right hind leg are grouped as one diagonal pair, while the right front leg and left hind leg are grouped as the other diagonal pair. During walking, the two diagonal pairs will be controlled to be alternately in contact with the surface (e.g., floor) where the robot is located. That is, when one diagonal pair is in a support state, the other diagonal pair will be in a swinging state, thereby ensuring that the spider-type quadruped robot can walk normally.

For a complete walking motion of the spider-type quadruped robot, its corresponding gait cycle can be composed of two consecutive diagonal leg support periods. The first diagonal leg support period indicates that the left front leg and the right hind leg of the spider-type quadruped robot are in a support state (i.e., the left front leg and the right hind leg are in contact with the surface where the robot is located), and at this time, the right front leg and the left hind leg of the spider-type quadruped robot are in a swinging state. Similarly, the second diagonal leg support period indicates that the right front leg and the left hind leg of the spider-type quadruped robot are in the support state, and at this time, the left front leg and the right hind leg of the spider-type quadruped robot are in a swinging state For a single diagonal leg support period, this period refers to the time period from when the corresponding diagonal legs make contact with the surface (e.g., floor) where the robot is located until they lift off. The position where the sole of the left front leg of the spider-type quadruped robot contacts the surface can be selected as the origin of the world coordinate system. A Cartesian right-handed coordinate system is established such that the positive direction of the X-axis in the world coordinate system is the robot's forward direction, the positive direction of the Z-axis points upward perpendicular to the ground, and the positive direction of the Y-axis represents the robot's lateral direction. This world coordinate system is to describe the actual movement of the spider-type quadruped robot within the entire global space.

In this disclosure, in order to ensure that the robot control device 10 can provide a highly universal turning motion planning method for different styles of spider-type quadruped robots, and use the turning motion planning method to enable the spider-type quadruped robots to achieve a smooth and fast body turning motion effect while maintaining the body posture stability, the present disclosure provides a method for trajectory planning of a turning motion of a spider-type quadruped robot to achieve the above-mentioned purpose, which will be described in detail below.

Figure 3:
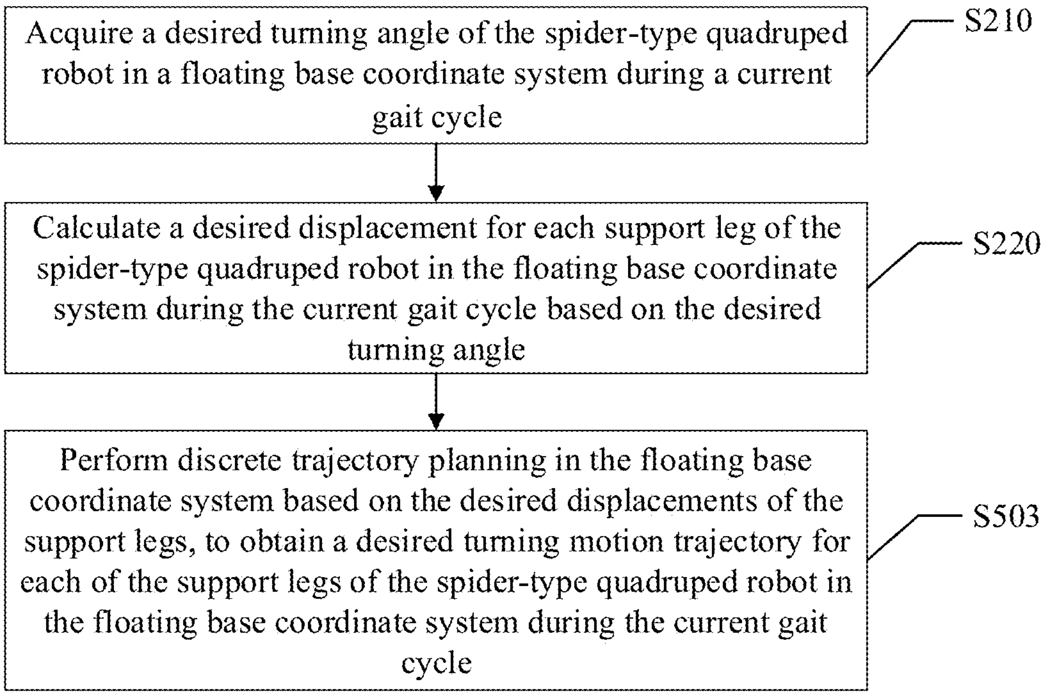
FIG. 3 is an exemplary flowchart of a method for trajectory planning of a turning motion of a spider-type quadruped robot according to one embodiment.
Figure 4:
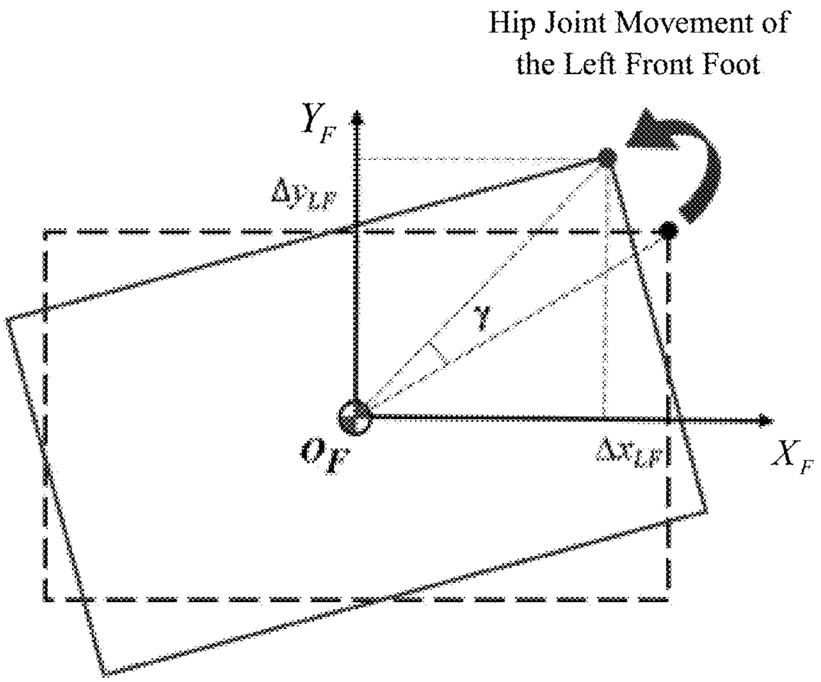
FIG. 4 is a schematic diagram of the body turning of the spider-type quadruped robot in the world coordinate system.

FIG. 3 is an exemplary flowchart of the method for trajectory planning of a turning motion of a spider-type quadruped robot according to one embodiment. FIG. 4 is a schematic diagram of the body turning of the spider-type quadruped robot in the world coordinate system. In one embodiment, the method shown in FIG. 3 may include steps S210 to S230.

Step S210: Acquire a desired turning angle of the spider-type quadruped robot in a floating base coordinate system during a current gait cycle.

In one embodiment, to achieve turning control during actual movement of the robot, the motion control operation of the spider-type quadruped robot can be decoupled into two control components. The two control components can include the motion component (1) of the spider-type quadruped robot moving forward along the positive direction of the axis $X_F$ of the floating base coordinate system, and the motion component (2) of the spider-type quadruped robot rotating around the axis $Z_F$ of the floating base coordinate system. The motion component (1) is to drive the spider-type quadruped robot forward or backward, and the motion component (2) is to drive the spider-type quadruped robot to generate self-rotation motion, such that the spider-type quadruped robot can achieve the turning motion effect. Therefore, the desired turning angle can be represented by the angle $\gamma$ in the plane $X_FO_FY_F$ in FIG. 3.

Step S220: Calculate a desired displacement for each support leg of the spider-type quadruped robot in the floating base coordinate system during the current gait cycle based on the desired turning angle.

In one embodiment, since the spider-type quadruped robot can only effectively adjust the body posture by driving the diagonal legs in the support state, it needs to plan an appropriate turning motion trajectory for each support leg in the plane $X_FO_FY_F$ of the floating base coordinate system to achieve the self-rotation gait adjustment effect shown in FIG. 4. The robot control device 10 can set the foot-end position of each support leg of the spider-type quadruped robot at the starting moment to coincide with the vertical projection of the hip joint of the support leg in the $X_FO_FY_F$ plane of the floating base coordinate system. Then, for each support leg, the distance that the hip joint of each support leg moves along the positive direction of the X axis in the world coordinate system is calculated, and the distance that the hip joint of each support leg moves along the positive direction of the Y axis in the world coordinate system is calculated, thereby ensuring that the body of the spider-type quadruped robot can rotate by the desired turning angle $\gamma$ around the axis $Z_F$ of the floating base coordinate system within a gait cycle. The values of the above-mentioned distances can be positive or negative. The desired turning angle $\gamma$, if positive, indicates that the spider-type quadruped robot currently needs to turn to the left side of the body of the robot. If the desired turning angle $\gamma$ is negative, it indicates that the robot currently needs to turn to the right side of the body of the robot.

Taking the robot turning diagram shown in FIG. 4 as an example, when the left front leg of the spider-type quadruped robot serves as a support leg and the desired turning angle is positive, the hip joint of the left front leg of the spider-type quadruped robot needs to move by a distance $\Delta x_{LF}$ in the forward direction (i.e., the X-axis direction) in the world coordinate system, and the hip joint of the left front leg of the spider-type quadruped robot needs to move a distance $\Delta y_{LF}$ in the lateral direction (i.e., the Y-axis direction) in the world coordinate system. This enables the hip joint of the left front leg of the spider-type quadruped robot to rotate by the desired turning angle $\gamma$ around the axis $Z_F$ of the floating base coordinate system within one gait cycle.

For each leg of the spider-type quadruped robot, if ${}^{W}P_{foot}$ represents the position coordinates of the foot end of the leg in the world coordinate system, ${}^{W}P_{hip}$ represents the position coordinates of the hip joint of the leg in the world coordinate system, and ${}^{W}P_{O_F}$ represents the position coordinates of the origin of the coordinate system of the floating base coordinate system in the world coordinate system, the position vector relationship between the leg and the origin of the coordinate system of the floating base coordinate system in the world coordinate system can be expressed by the following equations:

$$\begin{cases} {}^{W}X_{O_F}^{foot} = {}^{W}X_{O_F}^{hip} + {}^{W}X_{hip}^{foot} \\ {}^{W}X_{O_F}^{hip} = {}^{W}P_{hip} - {}^{W}P_{O_F} \\ {}^{W}X_{hip}^{foot} = {}^{W}P_{foot} - {}^{W}P_{hip} \end{cases},$$

where $${}^{W}X_{O_F}^{hip}$$

represents the position vector of the origin of the floating base coordinate system pointing to the hip joint of the leg in the world coordinate system, $$^{W}X_{O_F}^{foot}$$

represents the position vector of the origin of the floating base coordinate system pointing to the foot end of the leg in the world coordinate system, and $$^{W}X_{hip}^{foot}$$

represents the position vector of the hip joint of the leg pointing to the foot end of the support leg in the world coordinate system.

On this basis, within a gait cycle of the spider-type quadruped robot, the position vector change relationship in the world coordinate system concerning the changes in the motion of a single leg and the changes in the motion of the origin of the floating base coordinate system can be expressed by the following equations:

$$\begin{cases} ^{W}\Delta X_{O_F}^{foot} = {}^{W}\Delta X_{O_F}^{hip} + {}^{W}\Delta X_{hip}^{foot} \\ ^{W}\Delta X_{O_F}^{hip} = {}^{W}\Delta P_{hip} - {}^{W}\Delta P_{O_F} \\ ^{W}\Delta X_{hip}^{foot} = {}^{W}\Delta P_{foot} - {}^{W}\Delta P_{hip} \end{cases},$$

where $$^{W}\Delta X_{O_F}^{hip}$$

represents the change in the position vector $$^{W}X_{O_F}^{hip}$$

within a single gait cycle, $$^{W}\Delta X_{O_F}^{foot}$$

represents the change in the position vector $$^{W}X_{O_F}^{foot}$$

within a single gait cycle, $$^{W}\Delta X_{hip}^{foot}$$

represents the change in the position vector $$^{W}X_{hip}^{foot}$$

within a single gait cycle, $^{w}\Delta P_{hip}$ represent the change in position (i.e., displacement) of the hip joint of the leg within the world coordinate system in a single gait cycle, $^{w}\Delta P_{O}{}^{F}$ represent the change in position of the origin of the floating base coordinate system within the world coordinate system in a single gait cycle, and $^{w}\Delta P_{foot}$ represents the change in position of the position of the foot end of the leg within the world coordinate system in a single gait cycle.

In this process, it should be noted that the hip joint of each leg of the spider-type quadruped robot will not move relative to the body of the robot, which means that $$^{W}\Delta X_{O_F}^{hip}$$

is equal to zero. Additionally, the foot-end positions of the support legs need to maintain their original positions during the support period to prevent the corresponding support legs from slipping, meaning that $^{w}\Delta P_{foot}$ is equal to zero. For each support leg, the relationship between the position vector changes of the support leg and the origin of the floating base coordinate system within the world coordinate system over a single gait cycle can be expressed by the following equation:

$$^{W}\Delta X_{O_F}^{hip} = -{}^{W}\Delta P_{hip}.$$

At this time, for a single support leg of the spider-type quadruped robot, the change in the foot-end position of the support leg in a gait cycle in the floating base coordinate system can be expressed by the following equation:

$$^{F}\Delta P_{foot} = {}^{F}\Delta X_{O_F}^{foot} = R(\gamma)\cdot{}^{W}\Delta X_{O_F}^{foot} = -R(\gamma)\cdot{}^{W}\Delta P_{hip},$$

where $^{F}\Delta P_{foot}$ represents the change in the foot-end position of the support leg in a gait cycle in the floating base coordinate system, R(γ) represents the coordinate rotation matrix of the floating base coordinate system relative to the world coordinate system when the desired turning angle γ is met, and $^{w}\Delta P_{hip}$ represents the change in the position of the hip joint of the support leg in a gait cycle in the world coordinate system.

In summary, after obtaining the desired turning angle of the spider-type quadruped robot in the current gait cycle in the floating base coordinate system, the robot control device 10 will first calculate, for each support leg of the spider-type quadruped robot in the current gait cycle, the turning displacement of the hip joint of each support leg in the world coordinate system for achieving the desired turning angle. Then, based on the equation for calculating the change in the foot-end position of each support leg, data conversion will be performed on the turning displacement of the hip joint of each support leg to obtain the desired displacement of each support leg in the floating base coordinate system during the current gait cycle of the spider-type quadruped robot. Here, the desired displacement of each support leg represents the foot-end position displacement required for the corresponding support leg to achieve the desired turning motion effect in the current gait cycle in the floating base coordinate system. The desired turning motion effect corresponds to the desired turning angle.

Figure 5:
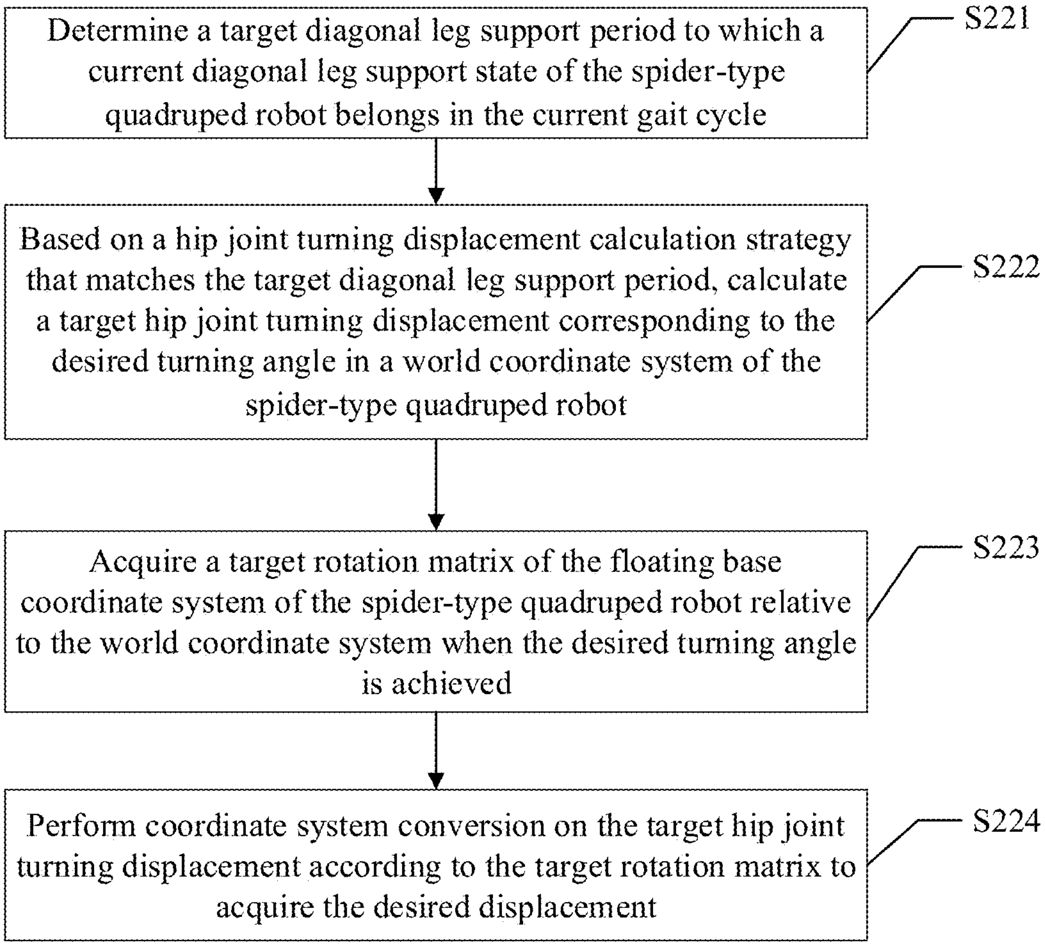
FIG. 5 is an exemplary flowchart of a method for calculating the desired displacement for each support leg of the spider-type quadruped robot according to one embodiment.

Referring to FIG. 5, in one embodiment, step S220 may include steps S221 to S224 to determine the desired displacement of each support leg required to achieve the desired turning motion effect in the current gait cycle in the floating base coordinate system of the spider-type quadruped robot.

Step S221: Determine a target diagonal leg support period to which a current diagonal leg support state of the spider-type quadruped robot belongs in the current gait cycle.

In one embodiment, the robot control device can obtain the foot-end position information of each of the four legs of the spider-type quadruped robot at the current motion moment to determine the actual diagonal legs in the support state at the current movement moment from the four legs of the spider-type quadruped robot. Then, the robot control device can determine whether the current motion moment actually belongs to the first diagonal leg support period or the second diagonal leg support period in the current gait cycle, and then directly use the diagonal leg support period to which the current motion moment belongs as the current target diagonal leg support period of the spider-type quadruped robot.

Step S222: Based on a hip joint turning displacement calculation strategy that matches the target diagonal leg support period, calculate a target hip joint turning displacement corresponding to the desired turning angle in a world coordinate system of the spider-type quadruped robot.

In one embodiment, when the target diagonal leg support period is the first diagonal leg support period, the hip joint turning displacement calculation strategy matching the target diagonal leg support period can be expressed by the following equations:

$$\begin{cases} \Delta x_{(LF,RH)} = -\frac{Wid}{2}\sin\gamma - \frac{Len}{2}(1-\cos\gamma) \\ \Delta y_{(LF,RH)} = \frac{Len}{2}\sin\gamma - \frac{Wid}{2}(1-\cos\gamma) \end{cases}.$$

When the target diagonal leg support period is the second diagonal leg support period, the hip joint turning displacement calculation strategy matching the target diagonal leg support period can be expressed by the following equations:

$$\begin{cases} \Delta x_{(RF,LH)} = -\frac{Wid}{2}\sin\gamma - \frac{Len}{2}(1-\cos\gamma) \\ \Delta y_{(RF,LH)} = \frac{Len}{2}\sin\gamma + \frac{Wid}{2}(1-\cos\gamma) \end{cases}.$$

In the equations above, $\Delta x_{(LF,RH)}$ represents components of turning displacements in a forward direction in the world coordinate system for hip joints corresponding to the left front leg and right hind leg of the spider-type quadruped robot when the left front leg and right hind leg are in the support state, $\Delta y_{(LF,RH)}$ represents components of turning displacements in a lateral direction in the world coordinate system for hip joints corresponding to the left front leg and right hind leg of the spider-type quadruped robot when the left front leg and right hind leg are in the support state, $\Delta x_{(RF,LH)}$ represents components of turning displacements in a forward direction in the world coordinate system for hip joints corresponding to the right front leg and left hind leg of the spider-type quadruped robot when the right front leg and left hind leg are in the support state, $\Delta y_{(RF,LH)}$ represents components of turning displacements in a lateral direction in the world coordinate system for hip joints corresponding to the right front leg and left hind leg of the spider-type quadruped robot when the right front leg and left hind leg are in the support state, $\gamma$ represents the desired turning angle of the spider-type quadruped robot in the floating base coordinate system during the current gait cycle, Len represents a distance between the hip joints corresponding to the left front leg and the left hind leg of the spider-type quadruped robot, or a distance between the hip joints corresponding to the right front leg and the right hind leg of the spider-type quadruped robot, Wid represents a distance between the hip joints corresponding to the left front leg and the right front leg of the spider-type quadruped robot, or a distance between the hip joints corresponding to the left hind leg and the right hind leg of the spider-type quadruped robot.

Therefore, when the robot control device 10 determines the current target diagonal leg support period of the spider-type quadruped robot, it will use the hip joint turning displacement calculation strategy that matches the target diagonal leg support period, and for each support leg corresponding to the target diagonal leg support period, calculate the desired turning displacement of the hip joint of the support leg in the current gait cycle in the world coordinate system, which includes the component of the turning displacement of the corresponding hip joint in the lateral direction of the world coordinate system, and the component of the turning displacement of the corresponding hip joint in the forward direction of the world coordinate system. Then, matrix construction processing is performed on the desired turning displacement of the hip joints of the two support legs in the current gait cycle in the world coordinate system to obtain the target hip joint turning displacement corresponding to the desired turning angle in the current gait cycle of the spider-type quadruped robot in the world coordinate system.

Step S223: Acquire a target rotation matrix of the floating base coordinate system of the spider-type quadruped robot relative to the world coordinate system when the desired turning angle is achieved.

In one embodiment, the robot control device 10 may pre-store coordinate system rotation matrixes of the floating base coordinate system of the spider-type quadruped robot relative to the world coordinate system at different turning angles, so that the robot control device 10 can directly extract the coordinate system rotation matrix that matches the desired turning angle from the multiple coordinate system rotation matrices stored in itself, and use the extracted coordinate system rotation matrix as the target rotation matrix.

Step S224: Perform coordinate system conversion on the target hip joint turning displacement according to the target rotation matrix to acquire the desired displacement.

In one embodiment, the coordinate system conversion relationship between the desired displacement for each support leg and the target hip joint turning displacement is expressed by the following equation: ${}^{F}\Delta P_{foot} = -R(\gamma)\cdot{}^{W}\Delta P_{hip}$, where ${}^{F}\Delta P_{foot}$ represents the desired displacement for each support leg of the spider-type quadruped robot in the floating base coordinate system during the current gait cycle, ${}^{W}\Delta P_{hip}$ represents the target hip joint turning displacement corresponding to the desired turning angle in the world coordinate system of the spider-type quadruped robot, $R(\gamma)$ represents the target rotation matrix of the floating base coordinate system of the spider-type quadruped robot relative to the world coordinate system when the desired turning angle is achieved.

When the target diagonal leg support period is the first diagonal leg support period, ${}^{W}\Delta P_{hip} = [\Delta x_{(LF,RH)}\ \Delta y_{(LF,RH)}]^{T}$ and $^{F}\Delta P_{foot}=[\Delta x'_{(LF,RH)}\ \Delta y'_{(LF,RH)}]^T$, where $\Delta x_{(LF,RH)}$ represents components of turning displacements in a forward direction in the world coordinate system for hip joints corresponding to the left front leg and right hind leg of the spider-type quadruped robot when the left front leg and right hind leg are in the support state, $\Delta y_{(LF,RH)}$ represents components of turning displacements in a lateral direction in the world coordinate system for hip joints corresponding to the left front leg and right hind leg of the spider-type quadruped robot when the left front leg and right hind leg are in the support state, $\Delta x_{(LF,RH)}$ represents components of desired support leg displacements of the left front leg and the right hind leg of the spider-type quadruped robot in the forward direction in the floating base coordinate system when the left front leg and the right hind leg are in the support state, and $\Delta y_{(LF,RH)}$ represents components of desired support leg displacements of the left front leg and the right hind leg of the spider-type quadruped robot in the lateral direction in the floating base coordinate system when the left front leg and the right hind leg are in the support state.

When the target diagonal leg support period is the second diagonal leg support period, $^{W}\Delta P_{hip}=[\Delta x_{(RF,LH)}\ \Delta y_{(RF,LH)}]^T$ and $^{F}\Delta P_{foot}=[\Delta x_{(RF,LH)}\ \Delta y_{(RF,LH)}]^T$, where $\Delta x_{(RF,LH)}$ represents components of turning displacements in a forward direction in the world coordinate system for hip joints corresponding to the right front leg and left hind leg of the spider-type quadruped robot when the right front leg and left hind leg are in the support state, $\Delta y_{(RF,LH)}$ represents components of turning displacements in a lateral direction in the world coordinate system for hip joints corresponding to the right front leg and left hind leg of the spider-type quadruped robot when the right front leg and left hind leg are in the support state, $\Delta x'_{(RF,LH)}$ represents components of desired support leg displacements of the right front leg and the left hind leg of the spider-type quadruped robot in the forward direction in the floating base coordinate system when the right front leg and the left hind leg are in the support state, $\Delta y'_{(RF,LH)}$ represents components of desired support leg displacements of the right front leg and the left hind leg of the spider-type quadruped robot in the lateral direction in the floating base coordinate system when the right front leg and the left hind leg are in the support state.

By executing the above-mentioned steps S221 to S224, the desired displacement of each support leg required to achieve the desired turning motion effect in the current gait cycle can be determined in the floating base coordinate system of the spider-type quadruped robot.

Step S230: Perform discrete trajectory planning in the floating base coordinate system based on the desired displacements of the support legs, to obtain a desired turning motion trajectory for each of the support legs of the spider-type quadruped robot in the floating base coordinate system during the current gait cycle.

In one embodiment, after the robot control device 10 determines the desired displacement for each support leg of the two diagonally distributed support legs of the spider-type quadruped robot required for achieving the desired turning motion effect in the current gait cycle in the floating base coordinate system, the robot control device 10 will perform discrete trajectory planning processing on the desired displacement for each support leg in the plane $X_FO_FY_F$ of the floating base coordinate system according to the time distribution of the supporting phase in the current gait cycle, to obtain the desired turning motion trajectory for each support leg of the diagonal support legs of the spider-type quadruped robot in the current gait cycle in the floating base coordinate system. Here, the desired turning motion trajectory for each support leg represents the foot-end motion trajectory required for the current support leg of the spider-type quadruped robot to achieve the desired turning motion effect in the floating base coordinate system.

In one embodiment, the desired turning motion trajectories for the support legs of the spider-type quadruped robot include desired turning motion trajectories of two current support legs of the spider-type quadruped robot in the current gait cycle in the floating base coordinate system. Step S230 may include: determine a target diagonal leg support period to which a current diagonal leg support state of the spider-type quadruped robot belongs in the current gait cycle; constrain the desired displacements for the support legs to the target diagonal leg support period for displacement discretization to obtain a corresponding displacement discretization result; and according to a relative position relationship and a relative motion relationship between the two current support legs of the spider-type quadruped robot, perform trajectory planning on the two support legs based on the displacement discretization result to acquire the desired turning motion trajectories of the two support legs in the current gait cycle in the floating base coordinate system.

In one embodiment, the relative position relationship between the two diagonal support legs in the support state can be expressed by the relative distribution of the actual positions of the foot ends of the two support legs in the floating base coordinate system. The relative motion relationship between the two diagonal support legs in the support state can be expressed by the relative relationship between the moving directions of the hip joints of the two support legs in the plane $X_FO_FY_F$. The moving directions of the hip joints of the two diagonal support legs in the support state in the plane $X_FO_FY_F$ are parallel and opposite.

By executing the steps S210 to S230, an appropriate turning motion trajectory for each support leg can be planned in real-time within a floating base coordinate system that adapts to the body posture during the motion of the spider-type quadruped robot, based on turning requirements. The planned turning trajectories for support legs ensure that the corresponding spider-type quadruped robot achieves smooth and rapid turning motion while maintaining body posture stability. Additionally, the turning motion planning approach described above can be applied to different types of spider-type quadruped robots, thereby enhancing the general applicability of the turning trajectory planning method for the spider-type quadruped robot.

Figure 6:
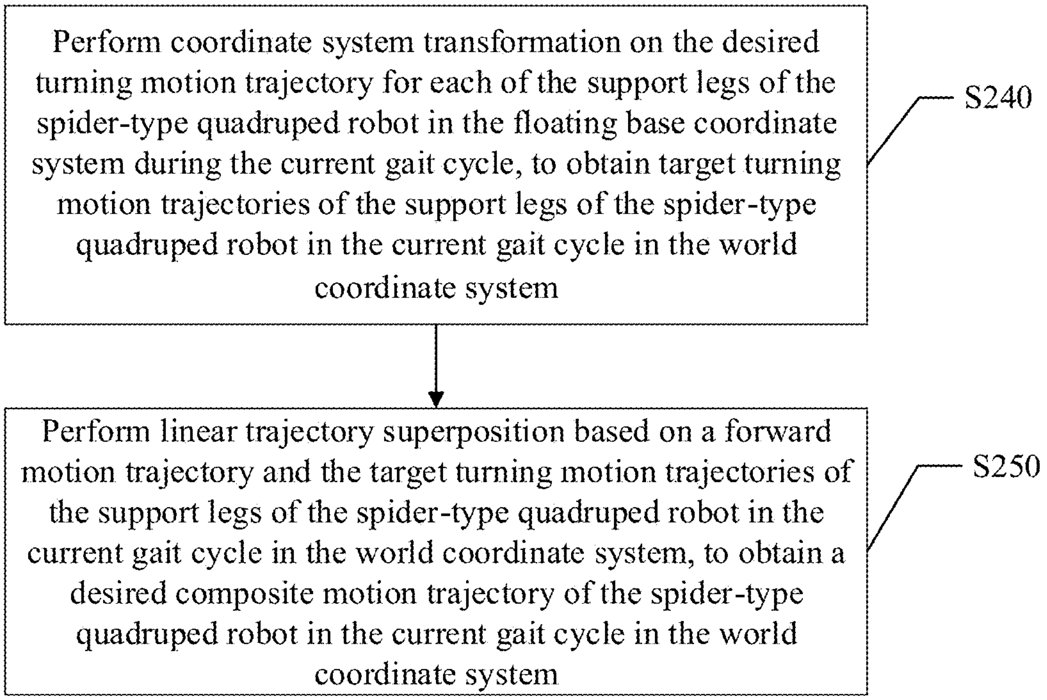
FIG. 6 is an exemplary flowchart of a method for trajectory planning of a turning motion of a spider-type quadruped robot according to another embodiment.

FIG. 6 is an exemplary flowchart of the method for trajectory planning of a turning motion of a spider-type quadruped robot according to another embodiment. Compared to the method shown in FIG. 3, the method illustrated in FIG. 6 can further include steps S240 and S250. These additional steps ensure that the planned turning motion trajectories can be superimposed onto the original forward motion trajectory of the spider-type quadruped robot. This allows the robot to achieve a stable, smooth, and rapid orbital motion around an instantaneous center of rotation in the world coordinate system, thereby preventing any instability in the body posture during the robot's turning motion.

Step S240: Perform coordinate system transformation on the desired turning motion trajectory for each of the support legs of the spider-type quadruped robot in the floating base coordinate system during the current gait cycle, to obtain target turning motion trajectories of the support legs of the spider-type quadruped robot in the current gait cycle in the world coordinate system.

In one embodiment, after obtaining the desired turning motion trajectory for each support leg of the spider-type quadruped robot in the current gait cycle in the floating base coordinate system, the robot control device 10 can perform a coordinate system transformation on the desired turning motion trajectory for each support leg based on the target rotation matrix of the floating base coordinate system of the spider-type quadruped robot relative to the world coordinate system when the desired turning angle is met, so as to obtain the target turning motion trajectory for each support leg of the spider-type quadruped robot in the current gait cycle in the world coordinate system.

Step S250: Perform linear trajectory superposition based on a forward motion trajectory and the target turning motion trajectories of the support legs of the spider-type quadruped robot in the current gait cycle in the world coordinate system, to obtain a desired composite motion trajectory of the spider-type quadruped robot in the current gait cycle in the world coordinate system.

In one embodiment, the robot control device 10 can linearly superimpose the forward motion trajectory and the target turning motion trajectory for each support leg within the same world coordinate system during the current gait cycle. This ensures that the final desired composite motion trajectory effectively combines the desired forward motion effect of the forward motion trajectory with the desired turning motion effect of the target turning motion trajectories for the support legs. When the spider-type quadruped robot moves along the desired composite motion trajectory in the world coordinate system, it can achieve stable, smooth, and rapid orbital motion around the instantaneous center of rotation, thereby preventing any instability in the body posture during the robot's turning process.

By executing the aforementioned steps S240 and S250, it is ensured that the planned robot turning motion trajectory can be superimposed onto the original forward motion trajectory of the spider-type quadruped robot. This allows the robot to achieve stable, smooth, and rapid orbital motion around the instantaneous center of rotation in the world coordinate system, preventing any instability in the body posture during the robot's turning process.

In order to ensure that the robot control device 10 can execute the above-mentioned trajectory planning method through the trajectory planning module 100, the present disclosure implements the above-mentioned functions by dividing the trajectory planning module 100 into functional modules, which will be described in detail below.

Figure 7:
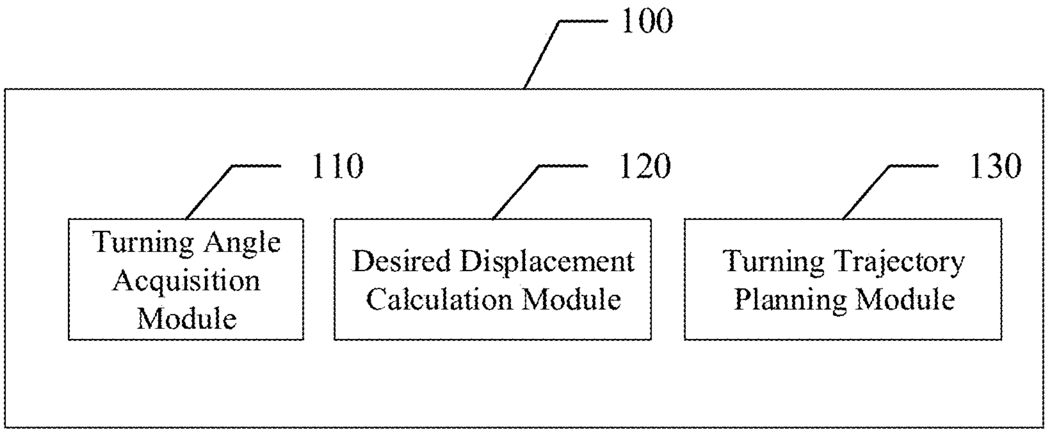
FIG. 7 is a schematic block diagram of a trajectory planning module according to one embodiment.

Referring to FIG. 7, in one embodiment, the trajectory planning module 100 may include a turning angle acquisition module 110, a desired displacement calculation module 120 and a turning trajectory planning module 130.

The turning angle acquisition module 110 is to acquire a desired turning angle of the spider-type quadruped robot in a floating base coordinate system during a current gait cycle. The desired displacement calculation module 120 is to calculate a desired displacement for each support leg of the spider-type quadruped robot in the floating base coordinate system during the current gait cycle based on the desired turning angle. The turning trajectory planning module 130 is to perform discrete trajectory planning in the floating base coordinate system based on the desired displacements of the support legs, to obtain a desired turning motion trajectory for each of the support legs of the spider-type quadruped robot in the floating base coordinate system during the current gait cycle.

Figure 8:
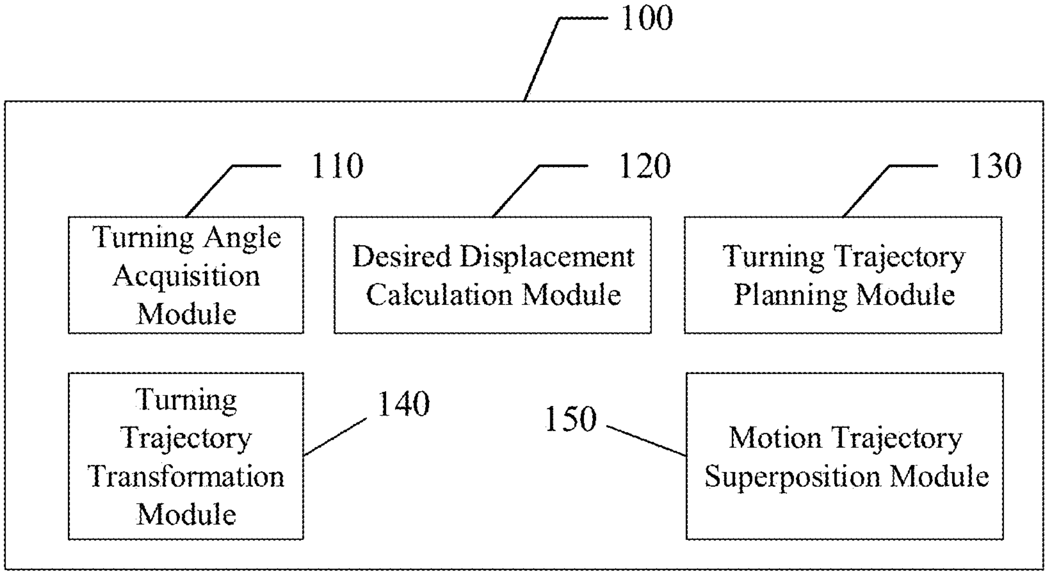
FIG. 8 is a schematic block diagram of the trajectory planning module according to another embodiment.

Referring to FIG. 8, in one embodiment, the trajectory planning module 100 may further include a turning trajectory transformation module 140 and a motion trajectory superposition module 150. The turning trajectory transformation module 140 is to perform coordinate system transformation on the desired turning motion trajectory for each of the support legs of the spider-type quadruped robot in the floating base coordinate system during the current gait cycle, to obtain target turning motion trajectories of the support legs of the spider-type quadruped robot in the current gait cycle in the world coordinate system. The motion trajectory superposition module 150 is to perform linear trajectory superposition based on a forward motion trajectory and the target turning motion trajectories of the support legs of the spider-type quadruped robot in the current gait cycle in the world coordinate system, to obtain a desired composite motion trajectory of the spider-type quadruped robot in the current gait cycle in the world coordinate system.

It should be noted that the trajectory planning module 100 shares the same basic principles and technical effects as the previously described trajectory planning method. For the sake of brief description, for the aspects not mentioned in this embodiment, reference can be made to the description of the aforementioned trajectory planning method.

It should be noted that the trajectory planning module 100 can be divided into functional modules to varying degrees based on various process embodiments of the above-mentioned trajectory planning method. For example, each step's function can be an individual functional module, or two or more step functions can be integrated into a single functional module. The above-mentioned functional modules can be implemented in the form of hardware or in the form of software functional modules. It should be noted that the functional module division shown in FIG. 7 or 8 is merely an illustrative example, representing just one way of logically dividing functions. The trajectory planning module 100 can be divided in other manners according to actual needs.

For example, the above-mentioned turning trajectory planning module 130, turning trajectory transformation module 140 and/or motion trajectory superposition module 150 can be divided into more modules. Alternatively, the turning trajectory planning module 130, turning trajectory transformation module 140 and motion trajectory superposition module 150 can be integrated into a single module. The present disclosure does not specifically limit the detailed implementation methods of the turning trajectory planning module 130, the turning trajectory transformation module 140, and the motion trajectory superimposition module 150. It should be that the specific implementation methods of the turning angle acquisition module 110 and/or the desired displacement calculation module 120 can refer to the implementation methods of the turning trajectory planning module 130, the turning trajectory transformation module 140, or the motion trajectory superimposition module 150 mentioned above, which will not be repeated here.

Another aspect of the present disclosure is directed to a non-transitory computer-readable medium. The non-transitory computer storage medium stores a computer program, which, when executed by the processor 12 of the robot control device 10, causes the processor 12 to perform the method for trajectory planning of the turning motion of the spider-type quadruped robot as discussed in the foregoing embodiments.

The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be, but is not limited to: a USB flash drive, a portable hard disk, a read-only memory (ROM), a random-access memory (RAM), a magnetic disk or an optical disk, and other media that can store program codes.

In summary, after the desired turning angle of the spider-type quadruped robot in the current gait cycle in the floating base coordinate system is obtained, the desired displacement of each support leg of the spider-type quadruped robot in the current gait cycle in the floating base coordinate system adapted to the body posture is calculated according to the desired turning angle. Then, discrete trajectory planning is performed in the floating base coordinate system according to the obtained desired displacement of each support leg, and the desired turning motion trajectory for each support leg of the spider-type quadruped robot in the current gait cycle in the floating base coordinate system is finally obtained. Thus, an appropriate turning motion trajectory for each support leg can be planned in real-time within a floating base coordinate system that adapts to the body posture during the motion of the spider-type quadruped robot, based on turning requirements. The planned turning trajectories for support legs ensure that the spider-type quadruped robot achieves smooth and rapid turning motion while maintaining body posture stability.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for trajectory planning of a turning motion of a quadruped robot, the method comprising:

acquiring a desired turning angle of the quadruped robot in a floating base coordinate system during a current gait cycle, wherein a single gait cycle of the quadruped robot comprises a continuous first diagonal leg support period and a second diagonal leg support period, and wherein legs of the quadruped robot are divided into diagonal pairs, and when either diagonal pair is in a support state, a remaining diagonal pair is in a swinging state;

calculating a desired displacement for each of two diagonally distributed support legs of the quadruped robot in the floating base coordinate system during the current gait cycle based on the desired turning angle;

performing discrete trajectory planning in the floating base coordinate system based on the desired displacements of the two diagonally distributed support legs, to obtain a desired turning motion trajectory for each of the two diagonally distributed support legs of the quadruped robot in the floating base coordinate system during the current gait cycle; and controlling the quadruped robot based on the desired turning motion trajectory for each of the two diagonally distributed support legs of the quadruped robot.

2. The method of claim 1, wherein the first diagonal leg support period is a period when a left front leg and a right hind leg of the quadruped robot are in a support state, and the second diagonal leg support period is a period when a right front leg and a left hind leg of the quadruped robot are in a support state; and wherein calculating the desired displacement for each of the two diagonally distributed support legs of the quadruped robot in the floating base coordinate system during the current gait cycle based on the desired turning angle comprises:

determining a target diagonal leg support period to which a current diagonal leg support state of the quadruped robot belongs in the current gait cycle;

based on a hip joint turning displacement calculation strategy that matches the target diagonal leg support period, calculating a target hip joint turning displacement corresponding to the desired turning angle in a world coordinate system of the quadruped robot;

acquiring a target rotation matrix of the floating base coordinate system of the quadruped robot relative to the world coordinate system when the desired turning angle is achieved; and performing coordinate system conversion on the target hip joint turning displacement according to the target rotation matrix to acquire the desired displacement.

3. The method of claim 2, wherein when the target diagonal leg support period is the first diagonal leg support period, the hip joint turning displacement calculation strategy corresponding to the target diagonal leg support period is expressed as follows:

$$\begin{cases} \Delta x_{(LF,RH)} = -\frac{Wid}{2}\sin\gamma - \frac{Len}{2}(1-\cos\gamma) \\ \Delta y_{(LF,RH)} = \frac{Len}{2}\sin\gamma - \frac{Wid}{2}(1-\cos\gamma) \end{cases};$$

when the target diagonal leg support period is the second diagonal leg support period, the hip joint turning displacement calculation strategy corresponding to the target diagonal leg support period is expressed as follows:

$$\begin{cases} \Delta x_{(RF,LH)} = -\frac{Wid}{2}\sin\gamma - \frac{Len}{2}(1-\cos\gamma) \\ \Delta y_{(RF,LH)} = \frac{Len}{2}\sin\gamma + \frac{Wid}{2}(1-\cos\gamma) \end{cases};$$

where $\Delta x_{(LF,RH)}$ represents components of turning displacements in a forward direction in the world coordinate system for hip joints corresponding to the left front leg and right hind leg of the quadruped robot when the left front leg and right hind leg are in the support state, $\Delta y_{(LF,RH)}$ represents components of turning displacements in a lateral direction in the world coordinate system for hip joints corresponding to the left front leg and right hind leg of the quadruped robot when the left front leg and right hind leg are in the support state, $\Delta x_{(RF,LH)}$ represents components of turning displacements in a forward direction in the world coordinate system for hip joints corresponding to the right front leg and left hind leg of the quadruped robot when the right front leg and left hind leg are in the support state, $\Delta y_{(RF,LH)}$ represents components of turning displacements in a lateral direction in the world coordinate system for hip joints corresponding to the right front leg and left hind leg of the quadruped robot when the right front leg and left hind leg are in the support state, Y represents the desired turning angle of the quadruped robot in the floating base coordinate system during the current gait cycle, Len represents a distance between the hip joints corresponding to the left front leg and the left hind leg of the quadruped robot, or a distance between the hip joints corresponding to the right front leg and the right hind leg of the quadruped robot, Wid represents a distance between the hip joints corresponding to the left front leg and the right front leg of the quadruped robot, or a distance between the hip joints corresponding to the left hind leg and the right hind leg of the quadruped robot.

4. The method of claim 2, wherein the coordinate system conversion is performed according to the following equation: ${}^{F}\Delta P_{foot}=-R(\gamma)\cdot{}^{w}\Delta P_{hip}$, where ${}^{F}\Delta P_{foot}$ represents the desired displacement for each support leg of the quadruped robot in the floating base coordinate system during the current gait cycle, ${}^{w}\Delta P_{hip}$ represents the target hip joint turning displacement corresponding to the desired turning angle in the world coordinate system of the quadruped robot, R(γ) represents the target rotation matrix of the floating base coordinate system of the quadruped robot relative to the world coordinate system when the desired turning angle is achieved;

when the target diagonal leg support period is the first diagonal leg support period, ${}^{W}\Delta P_{hip}=[\Delta x_{(LF,RH)}\Delta y_{(LF,RH)}]^T$ and $$ {}^{F}\Delta P_{foot}=\left[\Delta x'_{(LF,RH)}\Delta y'_{(LF,RH)}\right]^T, $$

where $\Delta x_{(LF,RH)}$ represents components of turning displacements in a forward direction in the world coordinate system for hip joints corresponding to the left front leg and right hind leg of the quadruped robot when the left front leg and right hind leg are in the support state, $\Delta y_{(LF,RH)}$ represents components of turning displacements in a lateral direction in the world coordinate system for hip joints corresponding to the left front leg and right hind leg of the quadruped robot when the left front leg and right hind leg are in the support state, $$ \Delta x'_{(LF,RH)} $$

represents components of desired support leg displacements of the left front leg and the right hind leg of the quadruped robot in the forward direction in the floating base coordinate system when the left front leg and the right hind leg are in the support state, and $$ \Delta y'_{(LF,RH)} $$

represents components or desired support leg displacements of the left front leg and the right hind leg of the quadruped robot in the lateral direction in the floating base coordinate system when the left front leg and the right hind leg are in the support state;

when the target diagonal leg support period is the second diagonal leg support period, ${}^{W}\Delta P_{hip}=[\Delta x_{(RF,LH)}\ \Delta y_{(RF,LH)}]^T$ and $$ {}^{F}\Delta P_{foot}=\left[\Delta x'_{(RF,LH)}\Delta y'_{(RF,LH)}\right]^T, $$

where Δx(RF,LH) represents components of turning displacements in a forward direction in the world coordinate system for hip joints corresponding to the right front leg and left hind leg of the quadruped robot when the right front leg and left hind leg are in the support state, $\Delta y_{(RF,LH)}$ represents components of turning displacements in a lateral direction in the world coordinate system for hip joints corresponding to the right front leg and left hind leg of the represents components of desired support leg displacements of the right front leg and the left hind leg of the $$ \Delta x'_{(RF,LH)} $$

quadruped robot in the forward direction in the floating base coordinate system when the right front leg and the left hind leg are in the support state, $$ \Delta y'_{(RF,LH)} $$

represents components of desired support leg displacements of the right front leg and the left hind leg of the quadruped robot in the lateral direction in the floating base coordinate system when the right front leg and the left hind leg are in the support state.

5. The method of claim 2, wherein the desired turning motion trajectories for the two diagonally distributed support legs of the quadruped robot comprise desired turning motion trajectories of the two diagonally distributed support legs of the type quadruped robot in the current gait cycle in the floating base coordinate system; and wherein performing the discrete trajectory planning in the floating base coordinate system based on the desired displacements of the two diagonally distributed support legs, to obtain the desired turning motion trajectory for each of the two diagonally distributed support legs of the quadruped robot in the floating base coordinate system during the current gait cycle, comprises:

determining a target diagonal leg support period to which a current diagonal leg support state of the quadruped robot belongs in the current gait cycle;

constraining the desired displacements for the two diagonally distributed support legs to the target diagonal leg support period for displacement discretization to obtain a corresponding displacement discretization result; and according to a relative position relationship and a relative motion relationship between the two diagonally distributed support legs of the quadruped robot, performing trajectory planning on the two diagonally distributed support legs based on the displacement discretization result to acquire the desired turning motion trajectories of the two diagonally distributed support legs in the current gait cycle in the floating base coordinate system.

6. The method of claim 2, further comprising:

performing coordinate system transformation on the desired turning motion trajectory for each of the two diagonally distributed support legs of the quadruped robot in the floating base coordinate system during the current gait cycle, to obtain target turning motion trajectories of the two diagonally distributed support legs of the quadruped robot in the current gait cycle in the world coordinate system; and performing linear trajectory superposition based on a forward motion trajectory and the target turning motion trajectories of the two diagonally distributed support legs of the quadruped robot in the current gait cycle in the world coordinate system, to obtain a desired composite motion trajectory of the quadruped robot in the current gait cycle in the world coordinate system.

7. The method of claim 2, wherein the desired displacement for each of the two diagonally distributed support legs is calculated under constraints, and wherein the constraints comprise:

a hip joint of each leg of the quadruped robot does not move relative to a body of the quadruped robot during a support period; and foot-end positions of the support legs of the quadruped robot remain unchanged during the support period.

8. The method of claim 1, wherein the floating base coordinate system is adapted to a body posture of the quadruped robot in real time; and wherein an origin of the floating base coordinate system coincides with a center of mass of a body of the quadruped robot, a positive direction of an X-axis of the floating base coordinate system always points to a forward direction of the quadruped robot, a positive direction of a Y-axis of the floating base coordinate system represents a current lateral direction of the body of the quadruped robot, and a positive direction of a Z-axis of the floating base coordinate system is perpendicular to an X-Y plane formed by the X-axis and the Y-axis and points upward.

9. A control device for a quadruped robot, comprising:

one or more processors; and a memory coupled to the one or more processors, the memory storing programs that, when executed by the one or more processors, cause performance of operations comprising:

acquiring a desired turning angle of the quadruped robot in a floating base coordinate system during a current gait cycle, wherein a single gait cycle of the quadruped robot comprises a continuous first diagonal leg support period and a second diagonal leg support period, and wherein legs of the quadruped robot are divided into diagonal pairs, and when either diagonal pair is in a support state, a remaining diagonal pair is in a swinging state;

calculating a desired displacement for each of two diagonally distributed support legs of the quadruped robot in the floating base coordinate system during the current gait cycle based on the desired turning angle;

performing discrete trajectory planning in the floating base coordinate system based on the desired displacements of the two diagonally distributed support legs, to obtain a desired turning motion trajectory for each of the two diagonally distributed support legs of the quadruped robot in the floating base coordinate system during the current gait cycle; and controlling the quadruped robot based on the desired turning motion trajectory for each of the two diagonally distributed support legs of the quadruped robot.

10. The control device of claim 9, wherein the first diagonal leg support period is a period when a left front leg and a right hind leg of the quadruped robot are in a support state, and the second diagonal leg support period is a period when a right front leg and a left hind leg of the quadruped robot are in a support state; and wherein calculating the desired displacement for each of the two diagonally distributed support legs of the quadruped robot in the floating base coordinate system during the current gait cycle based on the desired turning angle comprises:

determining a target diagonal leg support period to which a current diagonal leg support state of the quadruped robot belongs in the current gait cycle;

based on a hip joint turning displacement calculation strategy that matches the target diagonal leg support period, calculating a target hip joint turning displacement corresponding to the desired turning angle in a world coordinate system of the quadruped robot;

acquiring a target rotation matrix of the floating base coordinate system of the spider type quadruped robot relative to the world coordinate system when the desired turning angle is achieved; and performing coordinate system conversion on the target hip joint turning displacement according to the target rotation matrix to acquire the desired displacement.

11. The control device of claim 10, wherein when the target diagonal leg support period is the first diagonal leg support period, the hip joint turning displacement calculation strategy corresponding to the target diagonal leg support period is expressed as follows:

$$\begin{cases} \Delta x_{(LF,RH)} = -\frac{Wid}{2}\sin\gamma - \frac{Len}{2}(1-\cos\gamma) \\ \Delta y_{(LF,RH)} = \frac{Len}{2}\sin\gamma - \frac{Wid}{2}(1-\cos\gamma) \end{cases};$$

when the target diagonal leg support period is the second diagonal leg support period, the hip joint turning displacement calculation strategy corresponding to the target diagonal leg support period is expressed as follows:

$$\begin{cases} \Delta x_{(RF,LH)} = -\frac{Wid}{2}\sin\gamma - \frac{Len}{2}(1-\cos\gamma) \\ \Delta y_{(RF,LH)} = \frac{Len}{2}\sin\gamma + \frac{Wid}{2}(1-\cos\gamma) \end{cases};$$

where $\Delta x_{(LF,RH)}$ represents components of turning displacements in a forward direction in the world coordinate system for hip joints corresponding to the left front leg and right hind leg of the quadruped robot when the left front leg and right hind leg are in the support state, $\Delta y_{(LF,RH)}$ represents components of turning displacements in a lateral direction in the world coordinate system for hip joints corresponding to the left front leg and right hind leg of the quadruped robot when the left front leg and right hind leg are in the support state, $\Delta x_{(RF,LH)}$ represents components of turning displacements in a forward direction in the world coordinate system for hip joints corresponding to the right front leg and left hind leg of the quadruped robot when the right front leg and left hind leg are in the support state, $\Delta y_{(RF,LH)}$ represents components of turning displacements in a lateral direction in the world coordinate system for hip joints corresponding to the right front leg and left hind leg of the quadruped robot when the right front leg and left hind leg are in the support state, Y represents the desired turning angle of the quadruped robot in the floating base coordinate system during the current gait cycle, Len represents a distance between the hip joints corresponding to the left front leg and the left hind leg of the quadruped robot, or a distance between the hip joints corresponding to the right front leg and the right hind leg of the quadruped robot, Wid represents a distance between the hip joints corresponding to the left front leg and the right front leg of the quadruped robot, or a distance between the hip joints corresponding to the left hind leg and the right hind leg of the quadruped robot.

12. The control device of claim 10, wherein the coordinate system conversion is performed according to the following equation: ${}^{F}\Delta P_{foot}=-R(\gamma)\cdot{}^{w}\Delta P_{hip}$, where ${}^{F}\Delta P_{foot}$ represents the desired displacement for each support leg of the quadruped robot in the floating base coordinate system during the current gait cycle, ${}^{w}\Delta P_{hip}$ represents the target hip joint turning displacement corresponding to the desired turning angle in the world coordinate system of the quadruped robot, $R(\gamma)$ represents the target rotation matrix of the floating base coordinate system of the quadruped robot relative to the world coordinate system when the desired turning angle is achieved;

when the target diagonal leg support period is the first diagonal leg support period, ${}^{W}\Delta P_{hip}=[\Delta x_{(LF,RH)}\ \Delta y_{(LF,RH)}]^T$ and $${}^{F}\Delta P_{foot}=\left[\Delta x'_{(RF,LH)}\Delta y'_{(RF,LH)}\right]^T,$$

where $\Delta x_{(LF,RH)}$ represents components of turning displacements in a forward direction in the world coordinate system for hip joints corresponding to the left front leg and right hind leg of the quadruped robot when the left front leg and right hind leg are in the support state, $\Delta y_{(LF,RH)}$ represents components of turning displacements in a lateral direction in the world coordinate system for hip joints corresponding to the left front leg and right hind leg of the quadruped robot when the left front leg and right hind leg are in the support state, $$\Delta y'_{(RF,LH)}$$

represents components of desired support leg displacements of the left front leg and the right hind leg of the quadruped robot in the forward direction in the floating base coordinate system when the left front leg and the right hind leg are in the support state, and $${}^{F}\Delta P_{foot}=\left[\Delta x'_{(RF,LH)}\Delta y'_{(RF,LH)}\right]^T,$$

represents components of desired support leg displacements of the left front leg and the right hind leg of the quadruped robot in the lateral direction in the floating base coordinate system when the left front leg and the right hind leg are in the support state;

when the target diagonal leg support period is the second diagonal leg support period, ${}^{W}\Delta P_{hip}=[\Delta x_{(RF,LH)}\ \Delta y_{(RF,LH)}]^T$ and $$\Delta x'_{(RF,LH)}$$

where $\Delta x_{(RF,LH)}$ represents components of turning displacements in a forward direction in the world coordinate system for hip joints corresponding to the right front leg and left hind leg of the quadruped robot when the right front leg and left hind leg are in the support state, $\Delta y_{(RF,LH)}$ represents components of turning displacements in a lateral direction in the world coordinate system for hip joints corresponding to the right front leg and left hind leg of the quadruped robot when the right front leg and left hind leg are in the support state $$\Delta x'_{(RF,LH)}$$

represents components of desired support leg displacements of the right front leg and the left hind leg of the quadruped robot in the forward direction in the floating base coordinate system when the right front leg and the left hind leg are in the support state, $$\Delta y'_{(RF,LH)}$$

represents components of desired support leg displacements of the right front leg and the left hind leg of the quadruped robot in the lateral direction in the floating base coordinate system when the right front leg and the left hind leg are in the support state.

13. The control device of claim 10, wherein the desired turning motion trajectories for the two diagonally distributed support legs of the quadruped robot comprise desired turning motion trajectories of the two diagonally distributed support legs of the quadruped robot in the current gait cycle in the floating base coordinate system; and wherein performing the discrete trajectory planning in the floating base coordinate system based on the desired displacements of the two diagonally distributed support legs, to obtain the desired turning motion trajectory for each of the two diagonally distributed support legs of the quadruped robot in the floating base coordinate system during the current gait cycle, comprises:

determining a target diagonal leg support period to which a current diagonal leg support state of the quadruped robot belongs in the current gait cycle;

constraining the desired displacements for the two diagonally distributed support legs to the target diagonal leg support period for displacement discretization to obtain a corresponding displacement discretization result; and according to a relative position relationship and a relative motion relationship between the two diagonally distributed support legs of the quadruped robot, performing trajectory planning on the two diagonally distributed support legs based on the displacement discretization result to acquire the desired turning motion trajectories of the two diagonally distributed support legs in the current gait cycle in the floating base coordinate system.

14. The control device of claim 10, wherein the operations further comprise:

performing coordinate system transformation on the desired turning motion trajectory for each of the two diagonally distributed support legs of the quadruped robot in the floating base coordinate system during the current gait cycle, to obtain target turning motion trajectories of the two diagonally distributed support legs of the quadruped robot in the current gait cycle in the world coordinate system; and performing linear trajectory superposition based on a forward motion trajectory and the target turning motion trajectories of the two diagonally distributed support legs of the quadruped robot in the current gait cycle in the world coordinate system, to obtain a desired composite motion trajectory of the quadruped robot in the current gait cycle in the world coordinate system.

15. A non-transitory computer-readable storage medium storing instructions that, when executed by at least one processor of a control device for a quadruped robot, cause the at least one processor to perform a method for controlling the quadruped robot, the method comprising:

acquiring a desired turning angle of the quadruped robot in a floating base coordinate system during a current gait cycle, wherein a single gait cycle of the quadruped robot comprises a continuous first diagonal leg support period and a second diagonal leg support period, and wherein legs of the quadruped robot are divided into diagonal pairs, and when either diagonal pair is in a support state, a remaining diagonal pair is in a swinging state;

calculating a desired displacement for each of two diagonally distributed support legs of the quadruped robot in the floating base coordinate system during the current gait cycle based on the desired turning angle;

performing discrete trajectory planning in the floating base coordinate system based on the desired displacements of the two diagonally distributed support legs, to obtain a desired turning motion trajectory for each of the two diagonally distributed support legs of the quadruped robot in the floating base coordinate system during the current gait cycle; and controlling the quadruped robot based on the desired turning motion trajectory for each of the two diagonally distributed support legs of the quadruped robot.

16. The non-transitory computer-readable storage medium of claim 15, wherein the first diagonal leg support period is a period when a left front leg and a right hind leg of the quadruped robot are in a support state, and the second diagonal leg support period is a period when a right front leg and a left hind leg of the quadruped robot are in a support state; and wherein calculating the desired displacement for each of the two diagonally distributed support legs of the quadruped robot in the floating base coordinate system during the current gait cycle based on the desired turning angle comprises:

determining a target diagonal leg support period to which a current diagonal leg support state of the quadruped robot belongs in the current gait cycle;

based on a hip joint turning displacement calculation strategy that matches the target diagonal leg support period, calculating a target hip joint turning displacement corresponding to the desired turning angle in a world coordinate system of the quadruped robot;

acquiring a target rotation matrix of the floating base coordinate system of the quadruped robot relative to the world coordinate system when the desired turning angle is achieved; and performing coordinate system conversion on the target hip joint turning displacement according to the target rotation matrix to acquire the desired displacement.

17. The non-transitory computer-readable storage medium of claim 16, wherein when the target diagonal leg support period is the first diagonal leg support period, the hip joint turning displacement calculation strategy corresponding to the target diagonal leg support period is expressed as follows:

$$\begin{cases} \Delta x_{(LF,RH)} = -\frac{Wid}{2}\sin\gamma - \frac{Len}{2}(1-\cos\gamma) \\ \Delta y_{(LF,RH)} = \frac{Len}{2}\sin\gamma - \frac{Wid}{2}(1-\cos\gamma) \end{cases};$$

when the target diagonal leg support period is the second diagonal leg support period, the hip joint turning displacement calculation strategy corresponding to the target diagonal leg support period is expressed as follows:

$$\begin{cases} \Delta x_{(RF,LH)} = -\frac{Wid}{2}\sin\gamma - \frac{Len}{2}(1-\cos\gamma) \\ \Delta y_{(RF,LH)} = \frac{Len}{2}\sin\gamma + \frac{Wid}{2}(1-\cos\gamma) \end{cases};$$

where $\Delta x_{(LF,RH)}$ represents components of turning displacements in a forward direction in the world coordinate system for hip joints corresponding to the left front leg and right hind leg of the quadruped robot when the left front leg and right hind leg are in the support state, $\Delta y_{(LF,RH)}$ represents components of turning displacements in a lateral direction in the world coordinate system for hip joints corresponding to the left front leg and right hind leg of the quadruped robot when the left front leg and right hind leg are in the support state, $\Delta x_{(RF,LH)}$ represents components of turning displacements in a forward direction in the world coordinate system for hip joints corresponding to the right front leg and left hind leg of the quadruped robot when the right front leg and left hind leg are in the support state, $\Delta y_{(RF,LH)}$ represents components of turning displacements in a lateral direction in the world coordinate system for hip joints corresponding to the right front leg and left hind leg of the quadruped robot when the right front leg and left hind leg are in the support state, Y represents the desired turning angle of the quadruped robot in the floating base coordinate system during the current gait cycle, Len represents a distance between the hip joints corresponding to the left front leg and the left hind leg of the quadruped robot, or a distance between the hip joints corresponding to the right front leg and the right hind leg of the quadruped robot, Wid represents a distance between the hip joints corresponding to the left front leg and the right front leg of the quadruped robot, or a distance between the hip joints corresponding to the left hind leg and the right hind leg of the quadruped robot.

18. The non-transitory computer-readable storage medium of claim 16, wherein the coordinate system conversion is performed according to the following equation: ${}^{F}\Delta P_{foot} = -R(\gamma)\cdot{}^{w}\Delta P_{hip}$, where ${}^{F}\Delta P_{foot}$ represents the desired displacement for each support leg of the quadruped robot in the floating base coordinate system during the current gait cycle, ${}^{w}\Delta P_{hip}$ represents the target hip joint turning displacement corresponding to the desired turning angle in the world coordinate system of the quadruped robot, R(γ) represents the target rotation matrix of the floating base coordinate system of the quadruped robot relative to the world coordinate system when the desired turning angle is achieved;

when the target diagonal leg support period is the first diagonal leg support period, ${}^{W}\Delta P_{hip} = [\Delta x_{(LF,RH)}\ \Delta y_{(LF,RH)}]^T$ and $${}^{F}\Delta P_{foot} = \left[\Delta x'_{(RF,LH)} \Delta y'_{(RF,LH)}\right]^T,$$

where $\Delta x_{(LF,RH)}$ represents components of turning displacements in a forward direction in the world coordinate system for hip joints corresponding to the left front leg and right hind leg of the quadruped robot when the left front leg and right hind leg are in the support state, $\Delta y_{(LF,RH)}$ represents components of turning displacements in a lateral direction in the world coordinate system for hip joints corresponding to the left front leg and right hind leg of the quadruped robot when the left front leg and right hind leg are in the support state $$\Delta x'_{(RF,LH)}$$

represents components of desired support leg displacements of the left front leg and the right hind leg of the quadruped robot in the forward direction in the floating base coordinate system when the left front leg and the right hind leg are in the support state, and $$\Delta y'_{(RF,LH)}$$

represents components of desired support leg displacements of the left front leg and the right hind leg of the quadruped robot in the lateral direction in the floating base coordinate system when the left front leg and the right hind leg are in the support state;

when the target diagonal leg support period is the second diagonal leg support period, ${}^{W}\Delta P_{hip}=[\Delta x_{(RF,LH)}\ \Delta y_{(RF,LH)}]^T$ and $${}^{F}\Delta P_{foot} = \left[\Delta x'_{(RF,LH)} \Delta y'_{(RF,LH)}\right]^T,$$

where $\Delta x_{(RF,LH)}$ represents components of turning displacements in a forward direction in the world coordinate system for hip joints corresponding to the right front leg and left hind leg of the quadruped robot when the right front leg and left hind leg are in the support state, $\Delta y_{(RF,LH)}$ represents components of turning displacements in a lateral direction in the world coordinate system for hip joints corresponding to the right front leg and left hind leg of the quadruped robot when the right front leg and left hind leg are in the support state $$\Delta x'_{(RF,LH)}$$

represents components of desired support leg displacements of the right front leg and the left hind leg of the quadruped robot in the forward direction in the floating base coordinate system when the right front leg and the left hind leg are in the support state, $$\Delta y'_{(RF,LH)}$$

represents components of desired support leg displacements of the right front leg and the left hind leg of the quadruped robot in the lateral direction in the floating base coordinate system when the right front leg and the left hind leg are in the support state.

19. The non-transitory computer-readable storage medium of claim 16, wherein the desired turning motion trajectories for the two diagonally distributed support legs of the quadruped robot comprise desired turning motion trajectories of the two diagonally distributed support legs of the quadruped robot in the current gait cycle in the floating base coordinate system; and wherein performing the discrete trajectory planning in the floating base coordinate system based on the desired displacements of the two diagonally distributed support legs, to obtain the desired turning motion trajectory for each of the two diagonally distributed support legs of the quadruped robot in the floating base coordinate system during the current gait cycle, comprises:

determining a target diagonal leg support period to which a current diagonal leg support state of the quadruped robot belongs in the current gait cycle;

constraining the desired displacements for the two diagonally distributed support legs to the target diagonal leg support period for displacement discretization to obtain a corresponding displacement discretization result; and according to a relative position relationship and a relative motion relationship between the two diagonally distributed support legs of the quadruped robot, performing trajectory planning on the two diagonally distributed support legs based on the displacement discretization result to acquire the desired turning motion trajectories of the two diagonally distributed support legs in the current gait cycle in the floating base coordinate system.

20. The non-transitory computer-readable storage medium of claim 16, wherein the method further comprises:

performing coordinate system transformation on the desired turning motion trajectory for each of the two diagonally distributed support legs of the quadruped robot in the floating base coordinate system during the current gait cycle, to obtain target turning motion trajectories of the two diagonally distributed support legs of the quadruped robot in the current gait cycle in the world coordinate system; and performing linear trajectory superposition based on a forward motion trajectory and the target turning motion trajectories of the two diagonally distributed support legs of the quadruped robot in the current gait cycle in the world coordinate system, to obtain a desired composite motion trajectory of the quadruped robot in the current gait cycle in the world coordinate system.

* * * * *